(12) United States Patent
Ziegler (10) Patent No.: US 11,782,690 B2
(45) Date of Patent: Oct. 10, 2023

(54) DELIVERING APPLICATIONS OVER-THE-AIR WHILE SUPPORTING ORIGINAL EQUIPMENT MANUFACTURER MARKERS

(71) Applicant: DELL PRODUCTS, LP, Round Rock, TX (US)

(72) Inventor: Jeremy R. Ziegler, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 17/362,571

(22) Filed: Jun. 29, 2021

(65) Prior Publication Data

US 2022/0413822 A1 Dec. 29, 2022

(51) Int. Cl.
*G06F 8/61* (2018.01)
*G06F 21/12* (2013.01)

(52) U.S. Cl.
CPC ............. *G06F 8/61* (2013.01); *G06F 21/12* (2013.01); *G06F 2221/0766* (2013.01)

(58) Field of Classification Search
CPC ............ G06F 8/60–66; G06F 21/12; G06F 2221/0766
USPC .................................................. 717/168–178
See application file for complete search history.

(56) References Cited

U.S. PATENT DOCUMENTS

| | | | | |
|---|---|---|---|---|
| 6,385,766 B1* | 5/2002 | Doran, Jr. | ............... | G06F 8/63 707/999.203 |
| 7,912,993 B2 | 3/2011 | Ziegler | | |
| 9,665,464 B2 | 5/2017 | Ziegler et al. | | |
| 2002/0071322 A1* | 6/2002 | Hanyu | .................. | G06F 8/60 714/E11.135 |
| 2005/0172280 A1 | 8/2005 | Ziegler et al. | | |
| 2006/0106806 A1* | 5/2006 | Sperling | .............. | H04W 8/245 |
| 2008/0040714 A1* | 2/2008 | Wheeler | ................ | G06F 8/63 717/174 |
| 2009/0327551 A1 | 12/2009 | Ziegler | | |
| 2010/0205618 A1* | 8/2010 | Gonzalez | ............... | G06F 9/451 705/30 |
| 2015/0193220 A1* | 7/2015 | Rork | .................... | G06Q 10/20 717/170 |
| 2015/0347749 A1* | 12/2015 | Kiehtreiber | ........... | G06F 9/546 726/26 |

FOREIGN PATENT DOCUMENTS

WO WO-2004068424 A2 * 8/2004 ............. B60R 25/01

OTHER PUBLICATIONS

Original equipment manufacturer, Wikipedia, 2020, 3 pages, [retrieved on May 23, 2023], Retrieved from the Internet: <URL:https://web.archive.org/web/20200413225437/https://en.wikipedia.org/wiki/Original_equipment_manufacturer>.*

* cited by examiner

*Primary Examiner* — Geoffrey R St Leger
(74) *Attorney, Agent, or Firm* — Larson Newman, LLP (57) ABSTRACT

An information handling system retrieves entitlement associated with installing a software application, and downloads the software application associated with a version number. If the software application requires a marker associated with an original equipment manufacturer of the information handling system, then the marker may be copied from the original equipment manufacturer to the information handling system and associated with the software application. The software application may then be installed on the information handling system at a customer site.

18 Claims, 5 Drawing Sheets

DELIVERING APPLICATIONS OVER-THE-AIR WHILE SUPPORTING ORIGINAL EQUIPMENT MANUFACTURER MARKERS

FIELD OF THE DISCLOSURE

The present disclosure generally relates to information handling systems, and more particularly relates to delivering applications over-the-air while supporting original equipment manufacturer markers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system retrieves entitlement associated with installing a software application, and downloads the software application associated with a version number. If the software application requires a marker associated with an original equipment manufacturer of the information handling system, then the marker may be copied from the original equipment manufacturer to the information handling system and associated with the software application. The software application may then be installed on the information handling system at a customer site.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
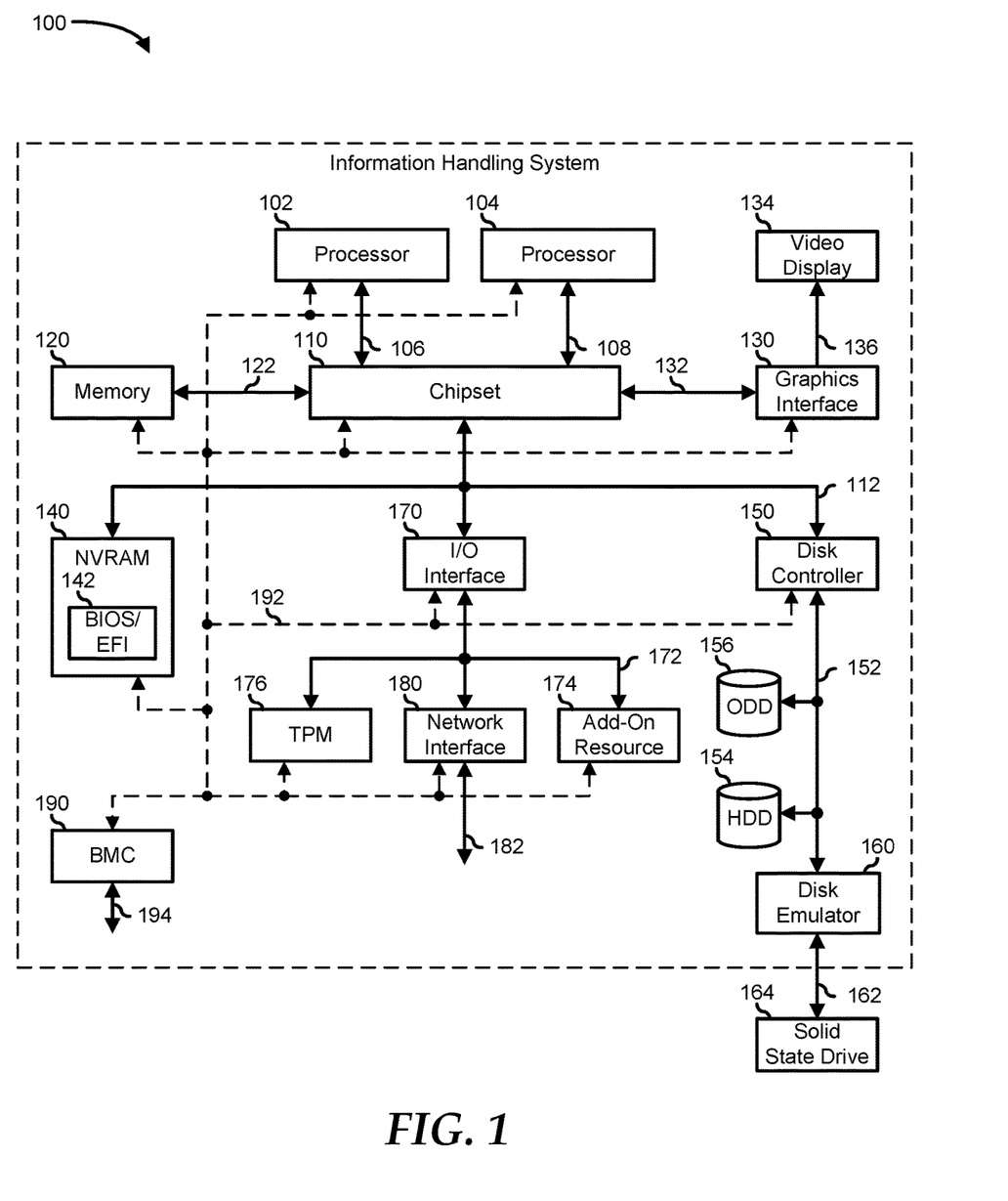
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a Southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

There are classes of applications that are installed in the factory by a manufacturer of an information handling system. Given timelines, the manufacturer typically locks on a version of the software application for the factory install. This causes the customer to get an outdated version of the software application during their "new" experience as well as costs the original equipment manufacturer factory time for installing older applications that need to be updated by the time someone uses the system. However, even though the manufacturer has locked on a version of the software application, the development continues. This causes the manufacturer to spend time in the factory installing an older version of the application in addition to the time spent by the end-user updating the software application to the latest version.

By moving to the installation of the software application from the factory to the customer site during the initial usage, the manufacturer saves time installing the application in the factory. Also, if there is an issue during the development of the software application, the manufacturer has more time to fix the issue avoiding delays in the shipment of the computer device. Because the manufacturer does not need to install all the software applications at the factory, the amount of burn time in the factory is reduced allowing for higher throughput and reducing costs of manufacture.

In addition, the end-user has the latest version of the software application which may also have the latest security updates providing a better customer experience. However, typically an end-user does not receive benefits associated with a factory installation of the software application when the software application is installed at the customer site instead of in the factory. To address the above and other concerns, the present disclosure allows for a customer site installation of the software application while maintaining the benefits of a factory installation.

Figure 2:
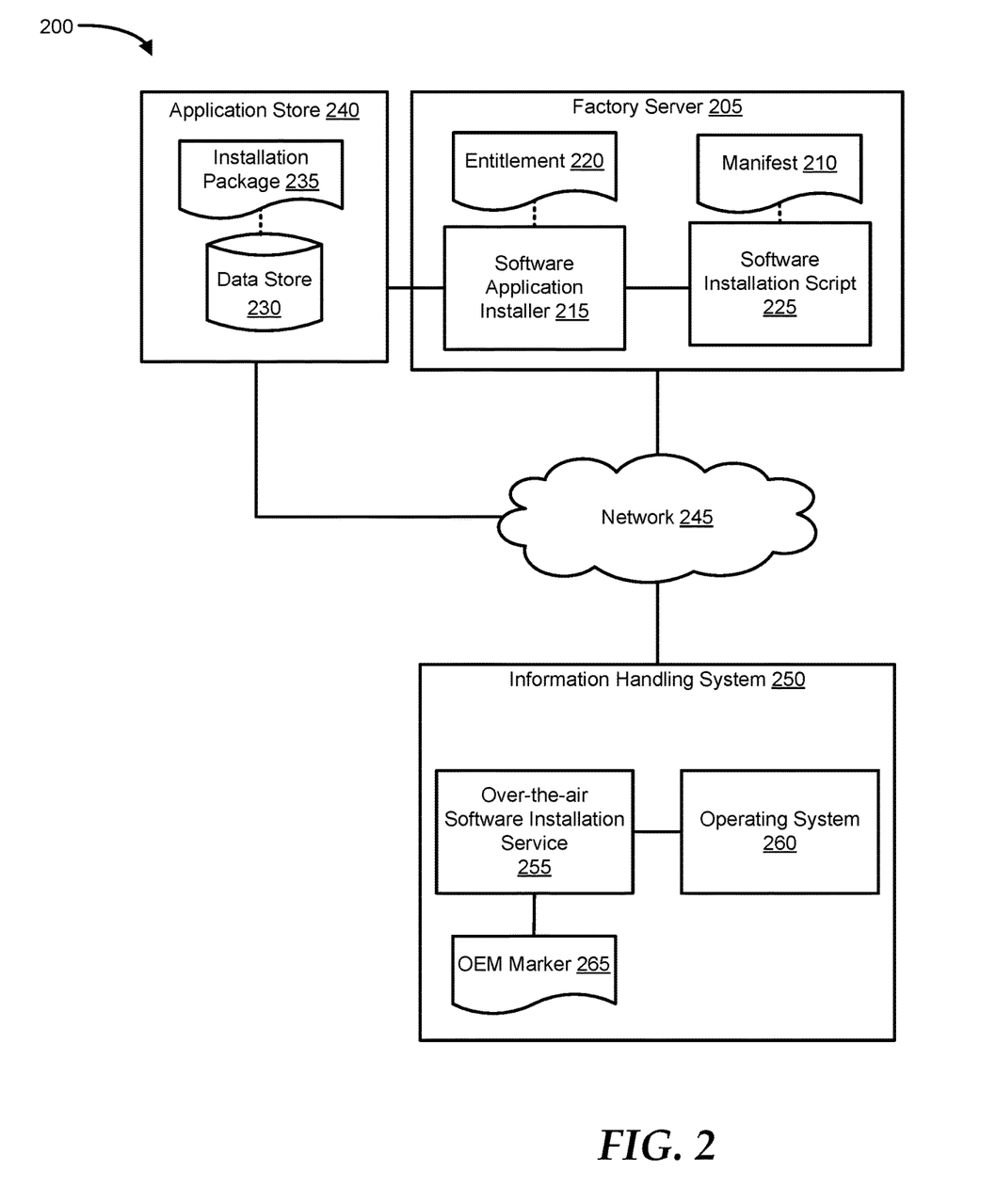
FIG. 2 is a block diagram illustrating a system for delivering applications over-the-air while supporting original equipment manufacturer markers, according to an embodiment of the present disclosure.

FIG. 2 shows an environment 200 for delivering software applications over-the-air while supporting original equipment manufacturer markers. Environment 200 includes a factory server 205, an application store 240, a network 245, and an information handling system 250. Factory server 205 includes a software installation script 225 and a software application installer 215. Application store 240 includes a data store 230 that stores an installation package 235. Factory software application installer 215 is communicatively coupled to application store 240 and information handling system 250 via network 245. Information handling system 250, which is similar to information handling system 100 of FIG. 1, includes an over-the-air software installation service 255 and an operating system 260. The components of environment 200 may be implemented in hardware, software, firmware, or any combination thereof. The components shown are not drawn to scale and environment 200 may include additional or fewer components. In addition, connections between components may be omitted for descriptive clarity.

During the manufacture of information handling system 250, different drivers and/or a first class of software applications are installed at the factory. A second class of software applications may be installed at the customer site. Checks can be performed to ensure that the drivers and/or software applications are compliant with requirements made by the manufacturer prior to the installation of the drivers and the first class and the second class of software applications.

At the factory, software application installer 215 may determine whether to install a software application at the factory or the customer site. For example, software application installer 215 may detect a token or a flag to determine the course of action for the software application. In one embodiment, if the token is detected then over-the-air software installation service 255 may install the software application at the customer site. Otherwise, the software application may install the software application at the factory. In another embodiment, if the flag is set, then the software application is to be installed at the customer site. Otherwise, the software application is installed at the factory.

As such, software application installer 215 is configured to support hybrid software installation, such as either a factory installation or customer site installation of the software application. Various factors may be used to determine whether to install the software application at the factory or the customer site. For example, if the software application is needed or desired for a hardware operation, then the software application may be installed at the factory. In another example, if the software application is larger than a size threshold, then the software application may be installed at the customer site. This would save factory time and increase factory throughput allowing for faster shipping of the computer device.

A software application may be associated with a software installation script, such as software installation script 225 which can be written using a scripting language, such as Python, PHP: Hypertext Preprocessor (PHP), JavaScript, or the like. Once it is determined that the software application is to be installed at the customer site, software installation script 225 may register itself at software application installer 215. The registration may be performed by adding a line at a file, such as a manifest 210 associated with the software application installer 215. Manifest 210 may be of various formats such as an extensible markup language (XML), JavaScript Object Notation (JSON), or the like. Information associated with the original equipment manufacturer marker requirement may also be included in the registration. Manifest 210 may include part number of software application in the order of installation or deployment and their dependencies.

In one example, a file associated with a stock-keeping unit (SKU), model number, computer device, etc. may include a list of part numbers corresponding to software applications, drivers, or a set of selected installation packages for software applications or drivers to be installed at the factory and another list of part numbers corresponding to software applications, drivers, or another set of selected installation packages for a software application or a driver to be installed over-the-air at the customer site. The part numbers may be arranged or listed according to an order of installation or dependencies.

Each software application may be associated with one software installation script like software installation script 225. If the software application is to be installed at the customer site, then an over-the-air software installation service and/or an original equipment manufacturer marker may be transmitted to the information handling system. In this example, over-the-air software installation service 255 is transmitted and dropped at information handling system 250 along with original equipment manufacturer marker 265.

Over-the-air software installation service 255 may be a software service that runs in the background and is registered with operating system 260 which allows the software service automatically runs after operating system 260 is initialized and/or after first reboot of the information handling system. Over-the-air software installation service 255 may have access to a registry associated with the operating system and location of original equipment manufacturer marker 265.

Over-the-air software installation service 255 may be configured to download installation package 235 from application store 240 and original equipment manufacturer marker 265 from factory server 205. In addition, over-the-air software installation service 255 copy original equipment manufacturer marker 265 to a location in information handling system 250 wherein over-the-air software installation service 255 has access rights to. Over-the-air software installation service 255 may also be configured to read entitlement information from entitlement 220. Downloading the software application from application store 240 allows the installation of the latest version of the software application at the customer site. Over-the-air software installation service 255 may pull the source content and/or installation package 235 directly from application store 240 via network 245. Network 245 may be a public network, such as the Internet, a physical private network, a wireless network, a virtual private network (VPN), or any combination thereof. Over-the-air software installation service 255 may be configured to run and perform above subsequent to the initial configuration of the operating system 260.

In addition, once the source content or the installation package of the software application has been transmitted information handling system 250, over-the-air software installation service 255 may be configured to retrieve and associate original equipment manufacturer marker 265 with the software application. This allows the original equipment manufacturer, also referred to as simply the manufacturer, to continue to share the benefits of the installation agreement with vendor or developer of the software application. Because original equipment manufacturer marker 265 is associated with the software application, the software application may be installed using a vendor-specified method. For example, the vendor may specify that the software application may be installed from a particular application store with a pre-installation kit to identify that the installation is associated with the manufacturer. The vendor specified method may be automatically run by over-the-air software installation service 255 to allow for the entitlements such as royalties or other benefits associated with original equipment manufacturer marker 265 for the end-user.

Original equipment manufacturer marker 265 may be a token, a bin file, or a data file that may be one of several formats such as an XML, JSON, or other suitable readable formats that are associated with entitlement 220. Original equipment manufacturer marker 265 may include information associated with the software application and/or the manufacturer, such as the location of the source bits, the name or unique identifier of the manufacturer, benefits or royalties associated with the manufacturer, etc. Original equipment manufacturer marker 265 may also include information associated with an agreement between the manufacturer and the developer of the software application associated with the installation of the software application. The agreement may include the rights and benefits provided to the end-user if the software application is installed by the manufacturer versus by the end-user. The benefits may include additional storage space, free or reduced monthly subscription price, etc. By associating original equipment manufacturer marker 265 with the software installation, the end-user of the software application may have the rights and benefits as if the software application was installed at the factory.

Prior to the installation of the software application, over-the-air software installation service 255 may query entitlement 220 for the entitlements associated with the software application relative to the manufacturer and/or the end-user. The entitlements retrieved may include information that allows the software application to be processed at information handling system 250 at the customer site. For example, the entitlements may include licensing information, version number, digital rights, that allow the latest version of the software application to be installed on the computer device and/or used by the end-user.

Manifest 210 may include information associated with the installation of the software application(s) such as the application store API, name, version number, dependencies, software application part numbers, order of installation, etc. In one example, manifest 210 may include a list of part numbers in order of installation. The part number may correspond to a software application or installation package. The first list of part numbers may correspond to a set of software applications to be installed at the factory and another list of part numbers may correspond to another list of software applications to be installed at the customer site. The manifest may also include information on whether the software application requires an original equipment manufacturer marker and its location. In addition, manifest 210 may be generated, populated, or modified during the factory installation of the software service at information handling system 250. Also, manifest 210 may be application-specific and be in a format such as an XML, JSON, or any format that is readable by the software service and an application at the application store. Finally, manifest 210 may also be encrypted so that only certain applications can access its contents.

Application store 240 includes data store 230 that includes the source content and/or installation package of the latest version of a software application, such as installation package 235. The installation package may be used by over-the-air installation service or software installation script 225 to install a software application at the customer site.

Those of ordinary skill in the art will appreciate that the configuration, hardware, and/or software components of environment 200 depicted in FIG. 2 may vary. For example, the illustrative components within environment 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
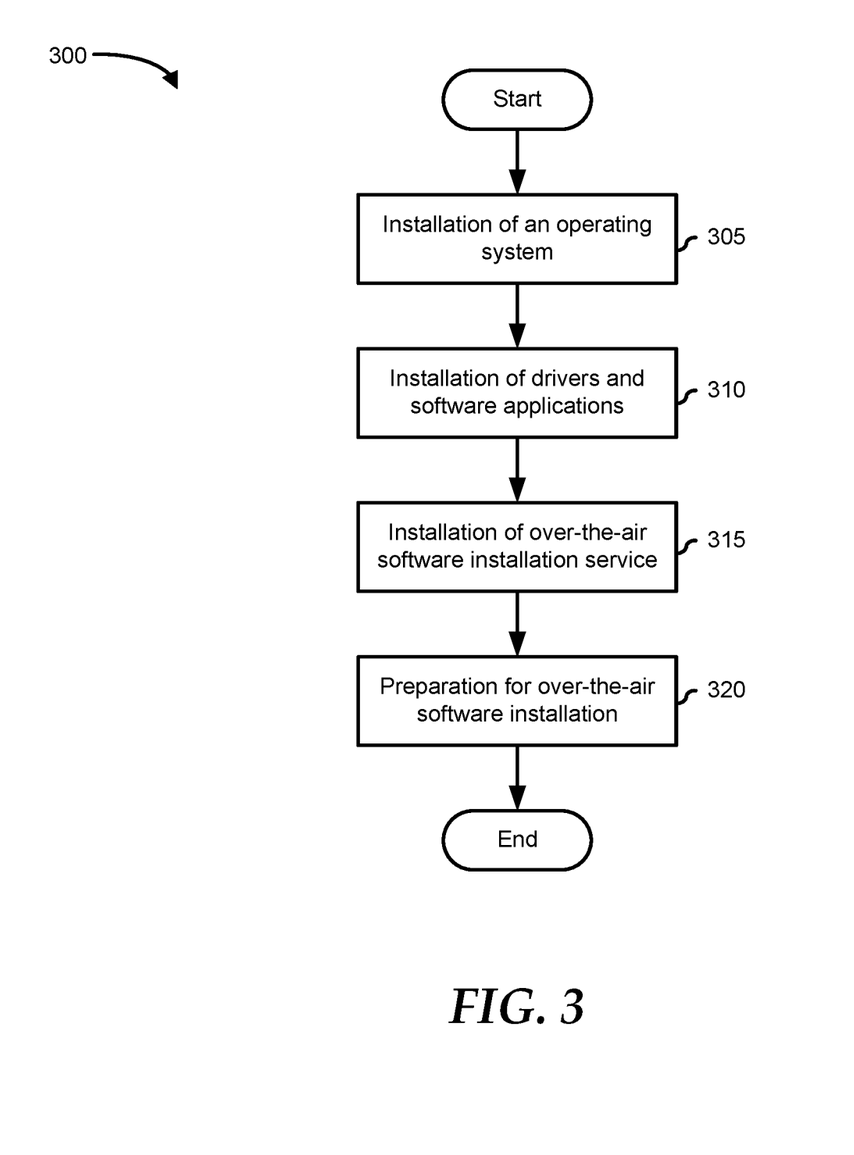
FIG. 3 is a flowchart illustrating a method for delivering applications over-the-air while supporting original equipment manufacturer markers, according to an embodiment of the present disclosure.

FIG. 3 shows a method 300 for delivering applications over-the-air while supporting original equipment manufacturer markers. Method 300 may be performed by one or more components of environment 200 of FIG. 2. In particular, method 300 may be performed by one or more components of a factory server 205 of the original equipment manufacturer of the information handling system during a manufacturing/factory process of the information handling system. While embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 300 typically starts at block 305 where a factory installation of an operating system is performed on an information handling system. At block 310, the method performs a factory installation of one or more drivers and/or software applications. The software applications installed at this block may be software applications for hardware components of the information handling system. Checks can be performed to ensure that the drivers and/or software are compliant with various requirements.

At block 315, the method installs a software service, such as over-the-air software installation service 255 of FIG. 2. In addition, this install may assert a flag or a token that the software service may use to branch code. In particular, the flag or token may be used by the software service to determine whether to install the software application over-the-air at the customer site subsequent to the out-of-the-box experience of an end-user or to install the software application at the factory. The token may be used to signal or indicate other software applications based on a list of part numbers. At block 320, the method performs one or more tasks to prepare the platform for over-the-air software installation. For example, the software service may create a branch in the code to allow for over-the-air software application installation at the customer site. The software service may register itself with the software application installer 215 by adding an entry in a data file such as manifest 210 for each software application to be installed at the customer site based on the setting of the flag or assertion of the token.

Figure 4:
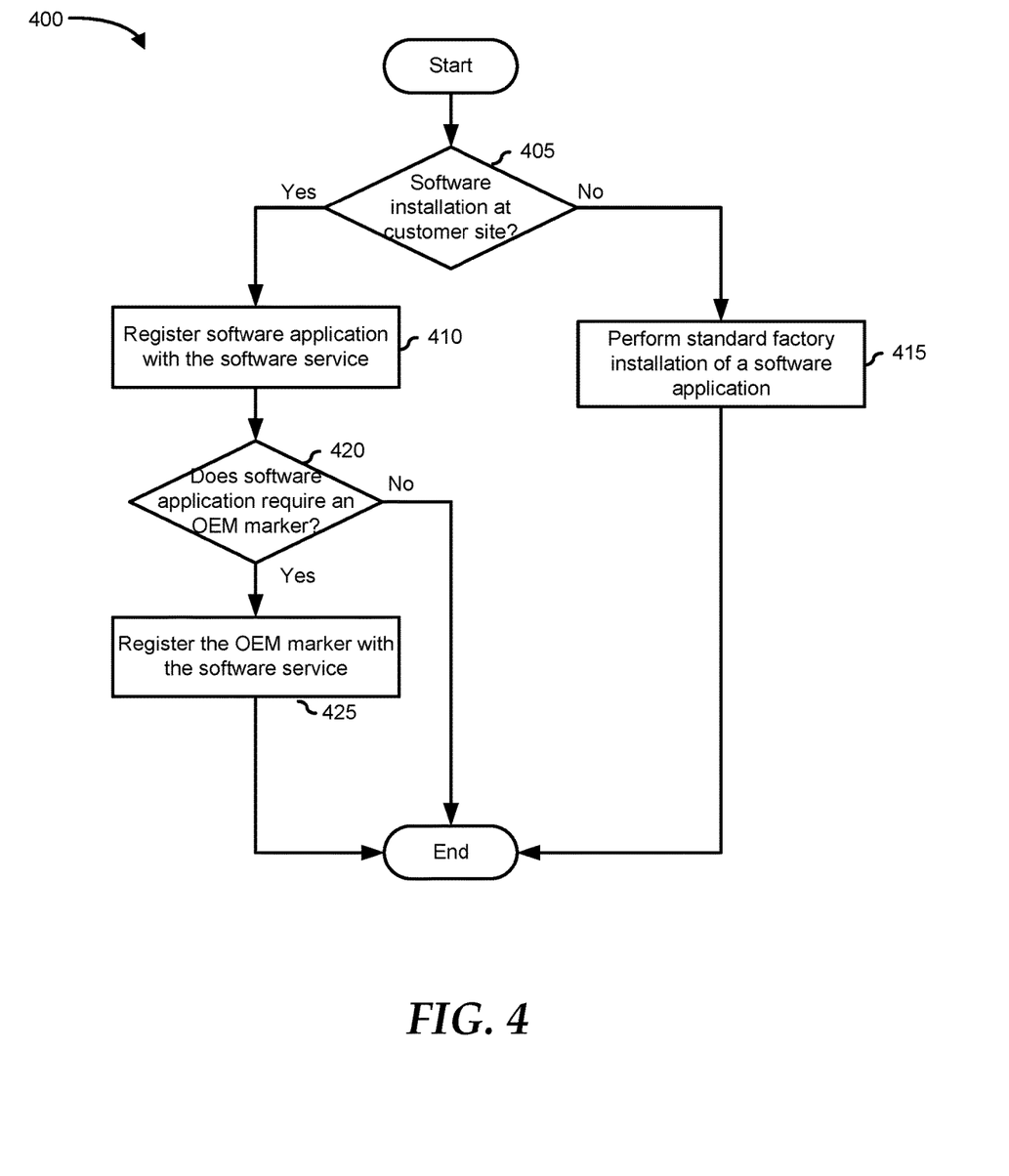
FIG. 4 is a flowchart illustrating an example of a method for delivering applications over-the-air while supporting original equipment manufacturer markers, according to an embodiment of the present disclosure.

FIG. 4 shows a method 400 for delivering applications over-the-air while supporting original equipment manufacturer markers. Method 400 may be performed by one or more components of environment 200 of FIG. 2. In particular, method 400 may be performed by one or more components of factory server 205, such as software installation script 225 of FIG. 2 during a manufacturing/factory process of an information handling system. For example, software installation script 225 may be updated to perform the logic of method 400. While embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 400 typically starts at decision block 405 where the method whether the software application is to be installed at the customer site or the factory. For example, if the flag is set then the software application may be installed at the customer site. Otherwise, the software application may be installed at the factory. If the software application is to be installed at the customer site, then the "YES" branch is taken and the method proceeds to block 410. If the software application is to be installed at the factory, then the "NO" branch is taken and the method proceeds to block 415.

At block 410, the method registers the software application with an over-the-air software installation service, also referred to herein as a software service. For example, the method may update a manifest file and add information associated with the software application to be installed at the customer site. After registering the software application, then the method proceeds to decision block 420 where the method determines if the software application requires an original equipment manufacturer marker also referred herein as a custom data file. If the software application requires the original equipment manufacturer marker, then the "YES" branch is taken and the method proceeds to block 425. If the software application does not require the original equipment manufacturer marker, then the "NO" branch is taken and the method ends.

At block 425, the method may copy the original equipment manufacturer marker to a location in the information handling system that is accessible by the software service. The method then registers the original equipment manufacturer marker with the software service. For example, the method may update the software service regarding the original equipment manufacturer marker requirement. At block 415, the method installs the software application at the factory. After registering the custom data file or installing the software application the method ends.

Figure 5:
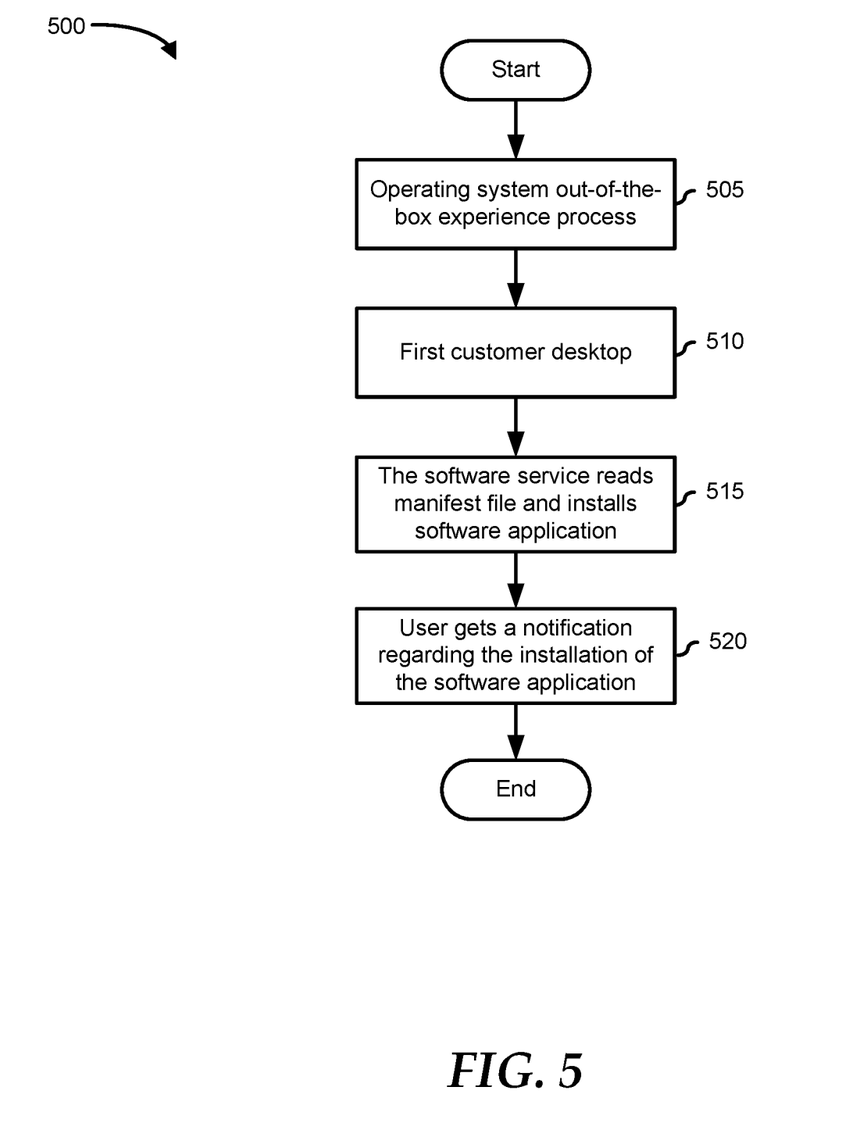
FIG. 5 is a flowchart illustrating an example of a method for delivering applications over-the-air while supporting original equipment manufacturer markers, according to an embodiment of the present disclosure.

FIG. 5 shows a method 500 for delivering applications over-the-air while supporting original equipment manufacturers markers. Method 500 may be performed by one or more components of environment 200 of FIG. 2. In particular, method 500 may be performed by one over-the-air software installation service 255 during and/or after the initial configuration of information handling system 250. While embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 500 typically starts at block 505 where an operating system out-of-box experience for an end-user is performed. The out-of-box experience may refer to the process of establishing an information handling system into an operational state. The out-of-box experience is performed during the first run of an information handling system preparing for its first use. Any suitable operating system may be contemplated for the present disclosure including Microsoft Windows®, UNIX®, and the like. Subsequent to the initialization of the operating system in the information handling system, then the method proceeds to block 510 where a welcome screen may be shown to the end-user at a first customer's desktop.

At this point, the operating system is functioning which may then initialize the software service. The software service may read the manifest file associated with one or more software applications to determine various information such as the vendor specified method, software information, and location of the original equipment manufacturer's marker. The software information may include what software to install, download location, API to use, and software application version to download which is typically the latest version of the software application. Based on the aforementioned information software service installs the software application(s) from an application store using the method defined by the developer or vendor of the software application at block 515. Responsive to a command or request from software service, the factory server or the application store can download one or more installation packages or source content of the software application to the information handling system for installation. Because the software service downloads the software application from the vendor specified location such as the application store, the end-user would have the latest version of the software application. After installation of the software application, the user gets a notification regarding the installation of the software application at block 520.

Although FIG. 3, FIG. 4, and FIG. 5 show example blocks of method 300, method 400, and method 500 in some implementation. Method 300, method 400, and method 500 may include additional blocks, fewer blocks, different blocks, or differently arranged blocks than those depicted in FIG. 3, FIG. 4, and FIG. 5. Additionally, or alternatively, two or more of the blocks of method 300 and method 400 may be performed in parallel. For example, block 410 and block 415 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    retrieving, by a processor, entitlement associated with installing a software application to an information handling system, wherein the entitlement includes a version number of the software application;
    determining that the software application is to be installed at a customer site instead of at a factory of an original equipment manufacturer based on a flag set at the original equipment manufacturer;
    downloading the software application associated with the version number;
    determining whether the software application requires a marker associated with the original equipment manufacturer of the information handling system;
    if the software application requires the marker, then copying the marker from the original equipment manufacturer to the information handling system and associating the marker with the software application; and
    installing the software application to the information handling system at the customer site, wherein the software application includes a benefit associated with the marker.

2. The method of claim 1, wherein the entitlement is retrieved from a server of the original equipment manufacturer.

3. The method of claim 1, further comprising downloading an installation package of the software application to the information handling system.

4. The method of claim 1, further comprising retrieving an application protocol address of an application store from a manifest.

5. The method of claim 1, wherein the installing of the software application is performed by a software service.

6. The method of claim 5, wherein the software service has access to the marker.

7. An information handling system, comprising:
    a memory device configured to store instructions; and
    a processor configured to:
        retrieve entitlement associated with installing a software application to the information handling system, wherein the entitlement includes a version number of the software application;
        determine that the software application is to be installed at a customer site instead of at a factory of an original equipment manufacturer based on a flag set at the original equipment manufacturer;
        download the software application associated with the version number;
        determine whether the software application requires a marker associated with the original equipment manufacturer of the information handling system;
        if the software application requires the marker associated with the original equipment manufacturer of the information handling system, then copy the marker from the original equipment manufacturer to the information handling system and associate the marker with the software application; and
        install the software application on the information handling system at the customer site, wherein the software application includes a benefit associated with the marker as if the software application was installed in the factory.

8. The information handling system of claim 7, wherein the download of the software application is performed after a determination that the software application is to be installed at the customer site instead of at the factory of the original equipment manufacturer.

9. The information handling system of claim 7, wherein the benefit is associated with the original equipment manufacturer.

10. The information handling system of claim 9, wherein the download of the software application is automatically performed on a first reboot of the information handling system.

11. The information handling system of claim 10, wherein the first reboot is performed after initial configuration of the information handling system.

12. The information handling system of claim 9, wherein the download is performed using a preferred method by a developer of the software application.

13. A method comprising:
    determining, by a processor, based on a flag set at an original equipment manufacturer whether to install a software application in a factory or over-the-air at a customer site;
    if the software application is to be installed over-the-air at the customer site then registering the software application with a software service, wherein the registering of the software application includes updating a manifest file with information associated with the software application;
    determining whether the software application requires an original equipment manufacturer marker; and
    if the software application requires the original equipment manufacturer marker, then copying the original equipment manufacturer marker to a location accessible by the software service and registering the original equipment manufacturer marker with the software service.

14. The method of claim 13, wherein the software service is a background process.

15. The method of claim 13, wherein the software service has access rights to a registry associated with an information handling system.

16. The method of claim 13, wherein the registering of the original equipment manufacturer marker allows the software application to have a benefit associated with the original equipment manufacturer.

17. The method of claim 13, further comprising reading a manifest to determine an application programming interface of an application store for download of the software application.

18. The method of claim 13, further comprising transmitting the original equipment manufacturer marker to an information handling system.

* * * * *